June 19, 1962 O. VIERLING 3,039,358

MEANS FOR PRESENTING STEREO PICTURES FOR VIEWING

Filed Dec. 29, 1959 5 Sheets-Sheet 1

Inventor
Otto Vierling
by Singer, Stern & Carlberg
Attorneys

Inventor
Otto Vierling
by Singer, Stern & Carlberg,
Attorneys

MEANS FOR PRESENTING STEREO PICTURES FOR VIEWING

Filed Dec. 29, 1959 5 Sheets-Sheet 3

Inventor
Otto Vierling
by Singer, Stern & Carlberg
Attorneys

June 19, 1962 O. VIERLING 3,039,358

MEANS FOR PRESENTING STEREO PICTURES FOR VIEWING

Filed Dec. 29, 1959 5 Sheets-Sheet 4

Inventor
Otto Vierling
by Singer, Stern & Carlberg
Attorneys

MEANS FOR PRESENTING STEREO PICTURES FOR VIEWING

Filed Dec. 29, 1959 5 Sheets-Sheet 5

Inventor
Otto Vierling
by Singer, Stern & Carlberg,
Attorneys

United States Patent Office 3,039,358

Patented June 19, 1962

3,039,358
MEANS FOR PRESENTING STEREO PICTURES FOR VIEWING

Otto Vierling, Stuttgart, Germany, assignor to Zeiss Ikon Aktiengesellschaft, Stuttgart S, Germany Filed Dec. 29, 1959, Ser. No. 862,615
Claims priority, application Germany Feb. 26, 1955
3 Claims. (Cl. 88—29)

The present invention relates to means and apparatus for projecting stereo pictures for viewing and particularly stereo pictures produced by a photographic camera having a single lens system and provided with a stereoscopic attachment. This is a continuation-in-part application of my pending United States application Serial Number 567,-574 filed on February 24, 1956, now abandoned.

It is well known that the pictures of a stereo pair which are produced by a single lens system and a suitable stereo attachment disclose a trapezoidal distortion. The reason for this distortion is as follows:

In two-dimensional photography the axis of the photographic lens system is always positioned at right angles to the picture plane. The center ray which connects the center of the lens system with the center of the picture coincides with the optical axis. When, however, the pictures of a stereo pair are produced by means of a single lens system then the centers of the pictures of the stereo pair are positioned laterally with respect to the optical axis of the lens system. In view thereof the center ray which passes from the center of each picture of the stereo pair to the center of the lens system is no longer positioned at right angles to the picture plane or to the film arranged in this picture plane. Each center ray is, however, caused to pass along a path, by means of a ray deflecting means, so that it intersects the optical axis in the finite or in the infinite. The picture planes of the pictures of the stereo pair form therefore, for a common rectangular object plane with the plane of the film two like angles in opposite directions. As a result thereof, the two pictures of the stereo pair appear distorted on the film or other light sensitive material, namely, in such a manner that any lines which appear horizontal in the object plane do not appear in the plane of the film as parallel lines, but as divergent or convergent lines. The distortions appear principally in horizontal directions because the lens system and the supplemental optical element attached in front of the lens system cause a deflection in this direction only. A rectangular object frame therefore will be reproduced in the picture plane in the form of a pair of trapezoidal frames, there are produced two trapezoids, the shorter parallel sides of which are arranged one adjacent the other. These distortions will be the larger the shorter the focal length of the lens system.

In order to stereoscopically view the stereo pairs, the pictures of the stereo pair are brought into superposition, either by projecting the stereo pair onto a screen or by directly viewing the stereo pair, for instance by employing a stereo viewer. In both cases, the left hand portion of the left picture of the stereo pair is brought into registration with the left hand portion of the right picture of the stereo pair and the right hand portion of the left picture of the stereo pair is brought into registration with the right hand portion of the right picture of the stereo pair. In view of the trapezoidal distortion of the pictures, the vertical boundary lines have a different length. Therefore, in the super-posed position the two pictures of the stereo pair have errors in their height which will cause the eyes of the viewer to experience discomfort and pain. Of course, not only the boundary lines cause this discomfort but also everything else within the pictures and particularly any horizontal lines within the same.

The only possibility to completely compensate for the distortion produced in the pictures of the stereo pair consists in projecting the same in a photographic device which is used in producing the same. The stereo pair would have to be illuminated from the rear and projected through the photographic lens system and the attachment containing for example prisms or mirrors, and the projection screen would have to be placed at a distance from the photographic device equal to the distance from which the picture was taken. It is obvious that only a certain predetermined projected distance can be used, but in actual practice this is difficult to accomplish.

It is an object of the present invention to project stereo pairs which were produced by a single lens camera and a stereo attachment by means of a two lens system projector and also to permit undistorted viewing of the stereo pair by means of direct viewers employing stereo viewers with ocular lenses. This is accomplished, according to the present invention by positioning in the path of the rays of both pictures of the stereo pair a rectifying element constructed in such a manner that it eliminates or compensates for any distortion which took place at the time the stereo pair was produced.

It is another object of the invention to employ for the purpose of effecting the mentioned rectification of distortion during the projection or viewing of stereo pairs such elements which are known as optical wedges, lenses of cylindrical, spherical and aspherical type and other transparent bodies of non-spherical form. It is also an object of the invention to eliminate any supplemental images when employing the above-mentioned rectifying elements and when the same are positioned in the path of the rays of the two pictures of a stereo pair. This is accomplished by positioning the rectifying means directly adjacent the plane of the stereo pair, so that the rectifying means according to the effect of a field lens does not produce any secondary images.

Still another object of the invention is to combine the rectifying means with one of the lenses of the lens system or with the ocular lenses. It is also another object of the invention to construct the above-mentioned lenses in such a manner that they produce the desired rectification.

The described distortion of the horizontal lines also covers the upper and lower boundary lines of the picture window. If the photographic camera were used exclusively for taking stereo pictures the picture window of the camera could be modified to accommodate stereo pictures. But as a rule, the camera is used also for taking two-dimensional pictures and the suggested modification of the picture window cannot be made.

Therefore, a still further object of the invention is to mount stereo pairs produced with a single lens camera in suitably formed frames or to combine a mount for the produced positive transparencies with such a frame. If this object of the invention is not employed the viewing of the stereo pair would still be possible, even though the upper and lower boundary lines would extend partly into the three-dimensional picture and would create a so-called floating margin which, however, would not form any part of the picture itself.

Another object of the invention is to provide a mask adjacent the stereo pairs while projecting the same onto a screen for viewing the same through a viewer in which the mask is provided with an opening of a shape similar to a pair of trapezoids with their short ends adjacent and their wider ends spaced apart. This structure provides a clear and undistorted marginal edge portion of the projected picture or in the viewed form and compensates for any irregularities at the marginal portions of the pictures.

With the above and other objects in view the invention will now be described in more detail and with particular reference to the accompanying drawings, in which:

FIGURES 1 and 2 diagrammatically illustrate the optical system for producing the stereoscopic pictures and the shape of the two pictures of the stereo pair produced by the optical system respectively.

FIGURE 3 diagrammatically illustrates how the pictures of the stereo pair shown in FIGURE 2 are combined in super-posed relation during projection and during viewing.

Figures 6, 7:
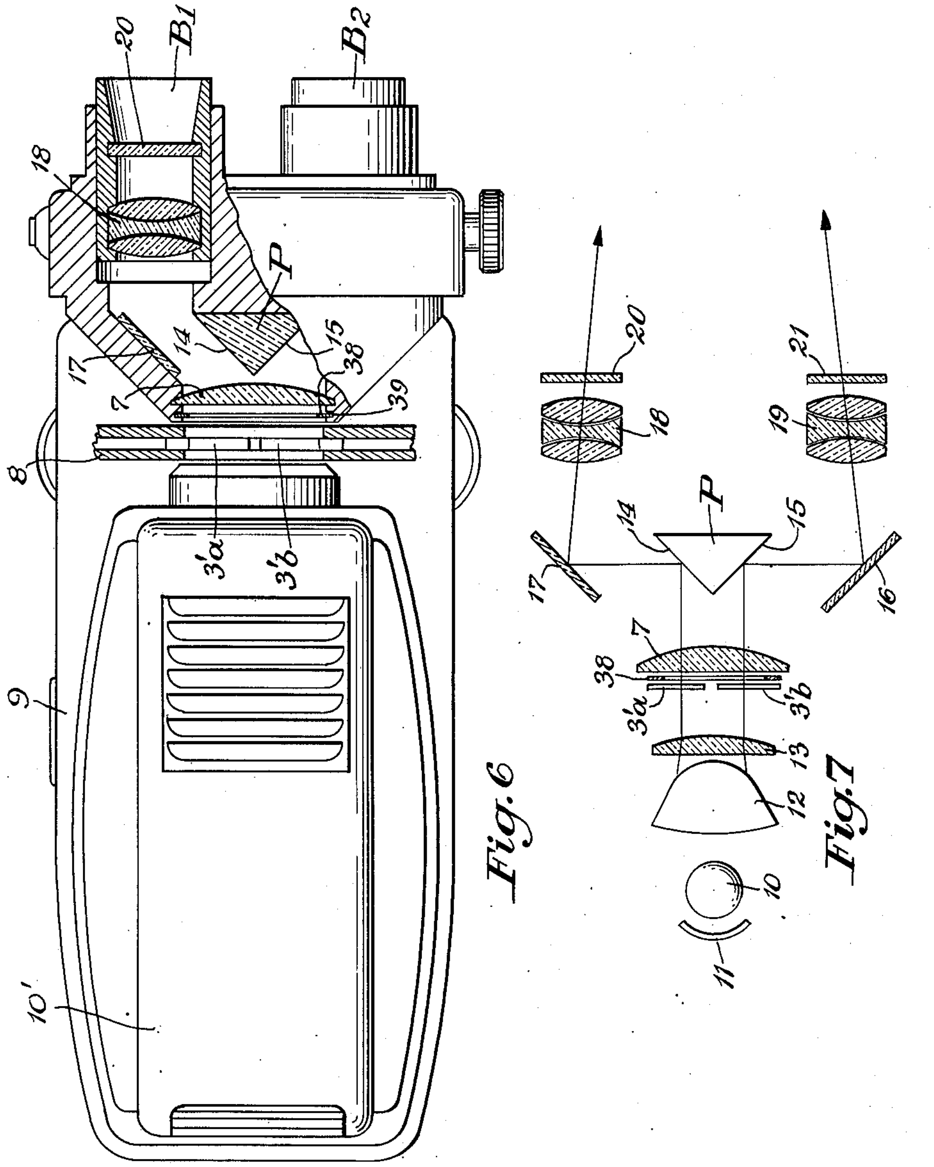
FIGURE 6 illustrates in plan view and partly in section a projector with two projection lens systems for projecting stereo pairs produced by a single lens camera and projecting the same onto a screen.

FIGURE 7 diagrammatically illustrates the optical projection system employed in the device shown in FIGURE 6.

Figure 8:
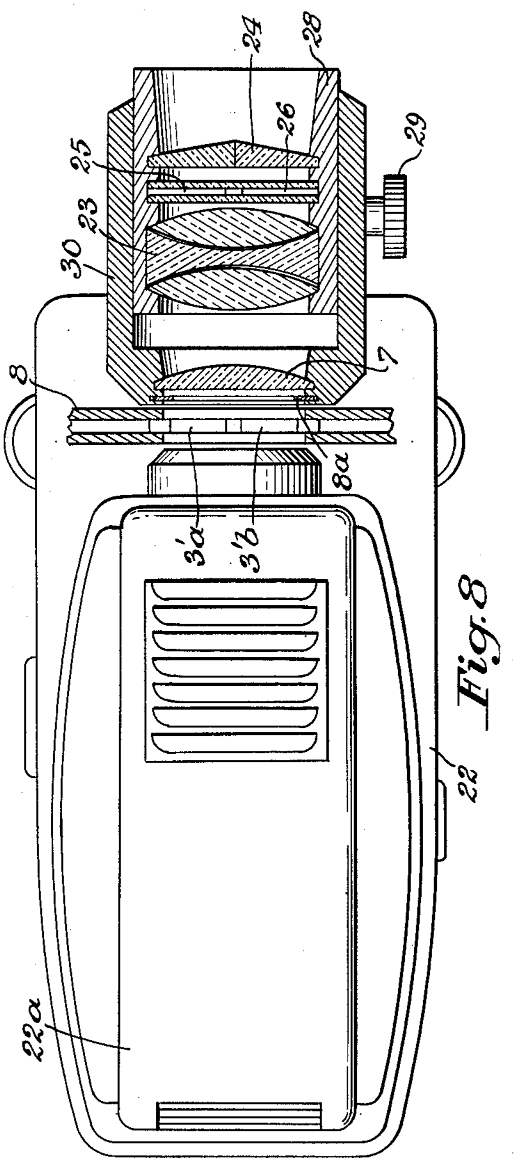

FIGURE 8 illustrates in plan view and partly in section a projector with one projection lens system for projecting stereo pairs produced by a single lens camera on a screen.

Figure 9:
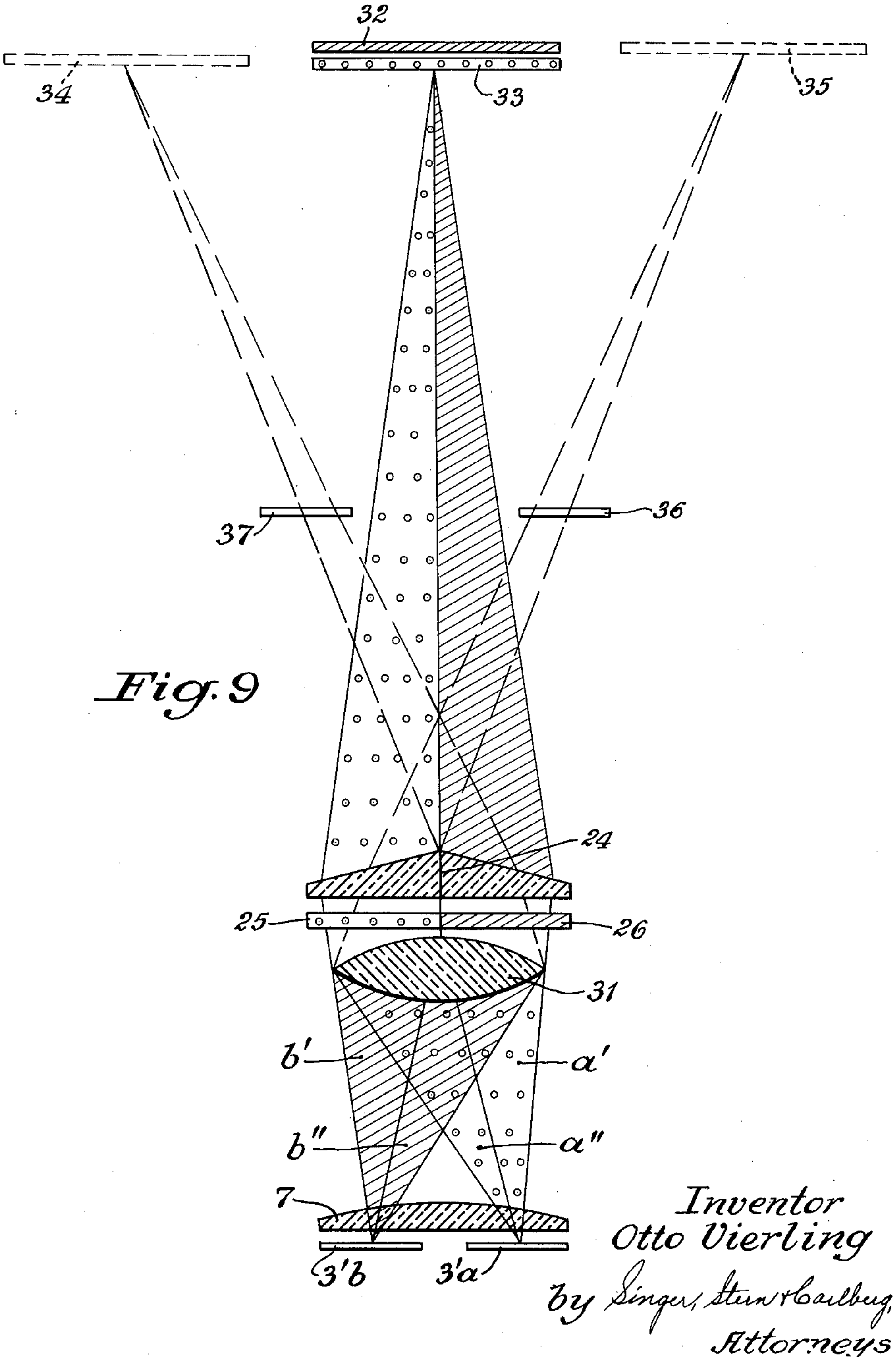

FIGURE 9 diagrammatically illustrates the optical projection system employed in the device shown in FIGURE 8.

Figure 10:
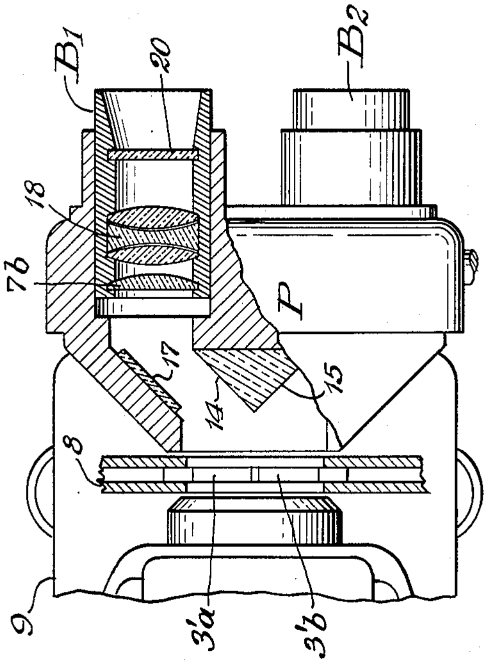

FIGURE 10 illustrates a modification of the stereo pair projecting device shown in FIGURE 6.

Figure 11:
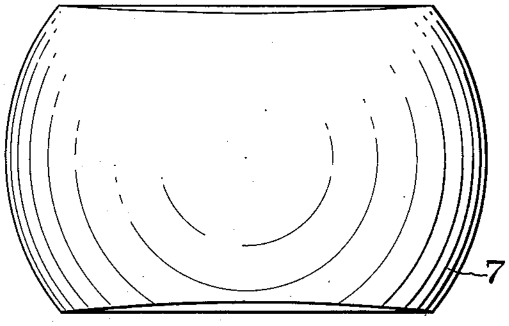

FIGURE 11 is a plan view of an aspherical lens employed in the various forms of the invention.

FIGURE 11–*a* is a longitudinal sectional view of the lens shown in FIGURE 11 and FIGURE 11–*b* is a vertical cross-sectional view of the aspherical lens shown in FIGURE 11.

Figure 1:
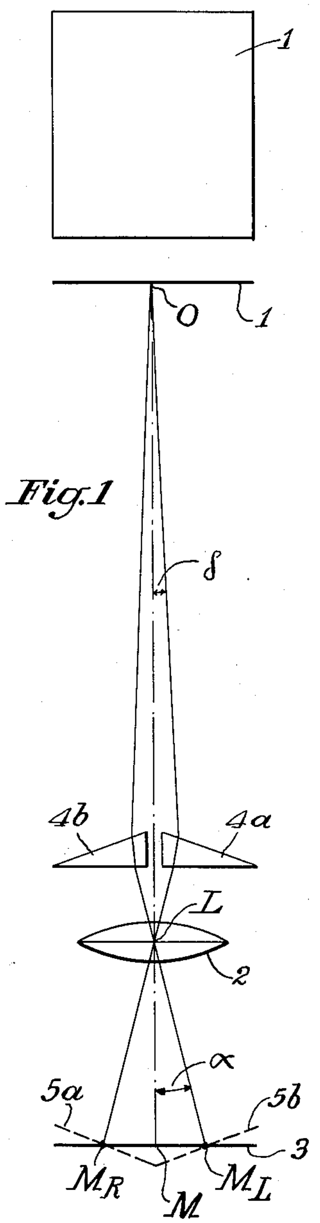
Figure 2:
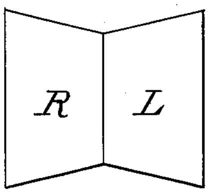

Referring to the drawing, and more in detail, FIGURES 1 and 2 illustrate the production of the distorted pictures of a stereo picture when a single photographic lens system with a stereo attachment is used. When the photographic lens 2 is used without the stereo attachment 4*a* and 4*b* a two-dimensional picture of the object in the object plane 1 will be produced in the picture plane 3. The ray which passes from the center O of the object through the center of the lens indicated at L and reaches the center M of the picture area coincides with the optical axis of the photographic lens system of the camera.

If now, the same camera is used to produce, by means of pupil division, the two pictures of a stereo pair, the two centers of the pictures will move as illustrated, laterally away from the optical axis to $M_R$ and $M_L$. The new center rays which connected the picture centers $M_R$ and $M_L$ with the center L of the lens 2 and then continues therebeyond have their extension deflected by deflecting means 4*a* and 4*b* respectively, so as to intersect in the finite or the infinite, for instance in the object plane 1 with the optical axis. In this manner the picture areas R and L for the stereo pair each will be given an equal size in view of the deflection of the rays. The picture planes 5*a* and 5*b* of the two pictures of the stereo pair no longer coincide with the picture plane 3 but they form with the latter angles of the same size but in an opposite direction.

Figure 3:
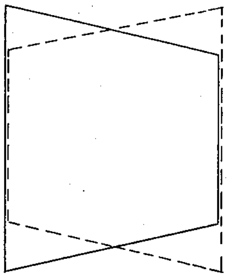

Nevertheless, the stereo pair will be projected onto the film in the picture plane 3 and thereby the mentioned distortion of the picture is produced namely, a trapezoidal distortion as illustrated in FIGURE 2. In order to view the stereo pair, the two pictures of the same are combined or superimposed as illustrated in FIGURE 3. The viewing eyes will react to such stereo pictures in much the same manner as they react to all other stereo pictures which have errors in their vertical dimensions; and in the present case the errors in height in different parts of the picture are of different magnitude.

It is clearly shown in FIGURE 1 that the portion $\alpha$ of the deflection of the ray from the center of the pictures and which deflection depends upon the focal length of the lens 2, is substantially greater than the portion $\delta$ of the deflection caused by the prism or mirror attachment which forms the base of the attachment normally arranged in front of the photographic lens 2. In view thereof, a rectification even when not completely possible of single lens stereo pairs could be obtained by employing in the projecting device a lens system having the same or approximately the same focal length as the camera lens system which was used in producing the stereo pair.

Figure 4:
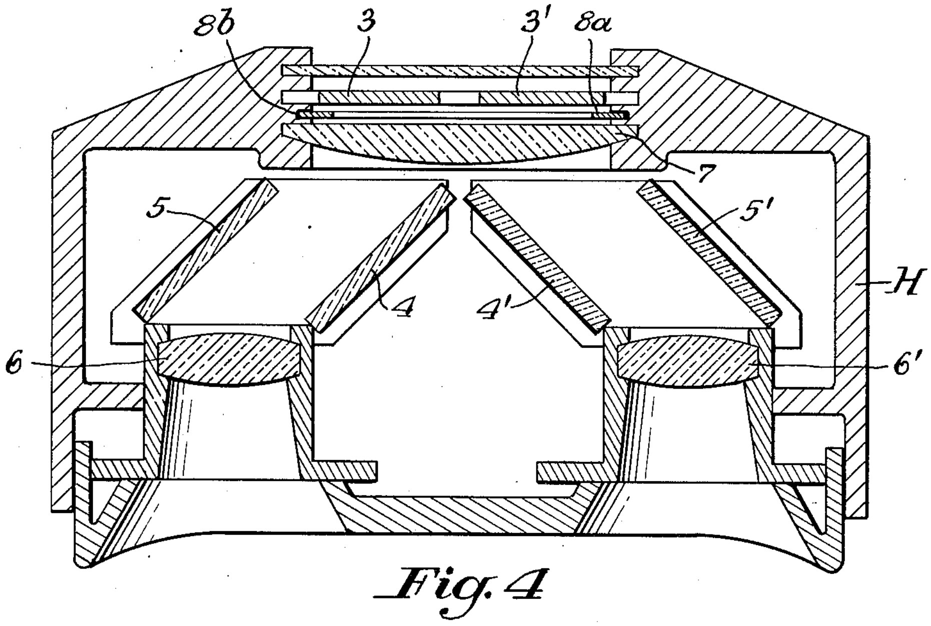
FIGURE 4 illustrates a sectional view of a stereo viewer of the invention.

As shown in FIGURE 4 there is illustrated a stereo viewer for viewing stereo pairs produced by a single lens camera with the stereo attachment. Mounted in the housing H are pairs of parallel mirrors 4, 5 and 4′, 5′ with ocular lenses 6 and 6′. The arrangement of these optical parts is such that in the viewing direction there is directly arranged in front of the stereo pair 3 and 3′ a rectifying member 7 of such a shape that it compensates as much as possible to correct the distortion which was produced during taking of the stereo pair.

Formed in the housing H between the stereo pair 3 and 3′ is a slideway 8*b* for slidably and removably receiving a mask 8*a* having an opening 8*c* shaped similar to an hourglass and of double trapezoidal shape. The mask 8*a* is slidably mounted in the slide 8*b* and can be removed if desired and replaced by a mask having a slightly larger or smaller opening 8*a* of double trapezoidal shape. The mask provides a marginal portion of the super-posed picture pair which is clear and corrects the irregularities appearing at the upper and lower edges of the viewed picture.

In FIGURES 6 and 7 there is illustrated a projection device having a dual lens projection system for projecting stereo pairs produced by a single lens camera with the stereo attachment. The pictures 3′*a* and 3′*b* of a stereo pair are placed in a slidable holder 8′ and are illuminated by a lamp 10 arranged in the lamp housing 10′ of the slide projector 9. The illumination system and optical equipment of this projector is diagrammatically illustrated in FIGURE 7. The light from the lamp 10 is reflected by a mirror 11 and passes through an aspherical condenser 12 and a field lens 13 in a direction toward the stereo pair 3′*a* and 3′*b*. A rectifying element 7 is positioned adjacent said stereo pair, namely, between the latter and the deflecting mirrors 14 and 15. The mirrors 14 and 15 direct the rays laterally and outwardly onto mirrors 16 and 17. Each pair of mirrors 14 and 17, and 15 and 16 being associated with one picture of the stereo pair. The mirrors 16 and 17 deflect the rays of the respective pictures through projection lens systems 18 and 19 respectively, which project the pictures of the stereo pair onto a screen in super-posed relation. In order to differently polarize the rays, each lens system 18 and 19 has associated therewith a polarizing filter 20—21 respectively. The separate viewing of the two polarized stereo images on the screen takes place in a well known manner by the use of analysers placed before the eyes of the viewer. As seen in FIGURE 6 the two reflecting faces 14 and 15 are combined in the form of a prism P. If desired, the projecting device may be modified by omitting the rectifying element 7 and placing a similar rectifying element in each barrel $B_1$ and $B_2$ which contains the lens systems 18 and 19 respectively. Such an embodiment of the invention is illustrated in FIGURE 10 which shows the lens system 18 combined with an aspherical glass body 7*b* constituting a rectifying element designed to compensate for the distortions of the picture of the stereo pair projected by the lens system 18. As shown in FIGURES 6 and 7 a mask 38 is removably mounted adjacent the picture pair 3′*a* and 3′*b* and the projector casing 10′ as shown in FIGURE 6 is provided with opposed grooves to form a slideway 39 for receiving the mask 38.

Figure 5:
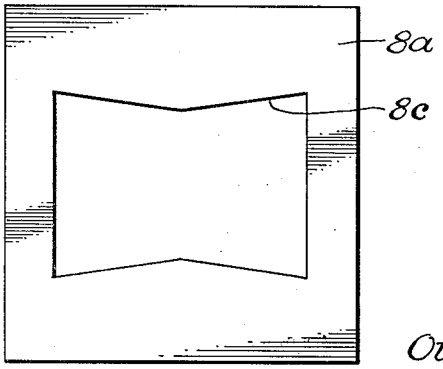
FIGURE 5 illustrates a distorted picture frame or picture mask which is used.

FIGURES 8 and 9 disclose a projecting device in which a single projection lens system is employed for projecting stereo pairs produced by a single lens camera with a stereo attachment. Also in this projecting device a rectifying member is used to compensate for the above-mentioned distortion in the stereo pair. The projecting device 22 is equipped with a conventional illuminating system arranged in the lamp housing 22*a* for illuminating the stereo pair 3'*a* and 3'*b* supported in the slidable holder 8. The projecting lens system 23 is combined with an optical double wedge 24 acting as a pupil divider. Furthermore, two different polarizers 25 and 26 respectively, are arranged between the lens system and the double wedge 24. The rectifying member 7 is arranged adjacent the stereo pair 3'*a*—3'*b* and namely on the side away from the side which faces the illuminating system. A mask such as shown in FIGURE 5 may also be employed and located between the stereo pair 3'*a* and 3'*b* and the rectifying element 7 showin in FIGURE 9. Preferably, a common barrel 28 is employed for holding the lens system 23, the polarizers 25—26 and the double wedge 24 as a unit. The barrel 28 is slidably and adjustably mounted in a tubular support 30 and is adapted to be adjusted by an operating knob 29.

The effect of the rectifying lens 7 is the same as in the preceding embodiments. For an understanding of this single lens projector, reference is now had to FIGURE 9 wherein the picture 3'*a* and 3'*b* of the stereo pair is projected by the lens system diagrammatically represented by the lens 31 through the polarizers 25 and 26 and the double wedge 24 onto the picture screen in the form of two super-imposed primary images 32 and 33. The optical double wedge 24 effects a pupil division according to which the bundle of light coming from the picture 3'*a* is divided into part bundles *a'* and *a''* of which the part *a'* furnishes the secondary image 34 and the part *a''* furnishes the primary image 33. In a similar manner the partial bundles of light *b'* and *b''* coming from the other picture 3'*b* is influenced by the wedge 24 in such a manner that it furnishes the primary image 32 and the secondary image 35. The two secondary images 34 and 35 may be intercepted by suitable diaphragms 36 and 37 arranged at any desired position between the projection lens system and the picture screen so that the images 34 and 35 will disappear and be invisible. The elimination of the secondary images may be accomplished in any other well known manner. It is, however, of importance in the present invention that the rectifying member 7 be arranged on the side of the stereo pair opposite the one which faces the illuminating system so that rectified or undistored pictures of a stereo pair will be projected.

If, according to the conditions of the single lens system camera, the stereo pair is produced by a suitable attachment applied to a conventional camera one would give the stereo pair a rectangular frame, then the frame upon projection of the stereo pair would appear distorted on the screen in view of the rectification of the image as produced by the rectifying member, or in other words the two pictures of the stereo pair would appear with a trapezoidal boundary line on the screen. This can be prevented, however, when the produced distorted stereo pair are provided with a correspondingly distorted mask. for instance as shown at 8*a* in FIGURE 5. This mask may be combined with the mounting board or slide into which the stereo pairs are assembled and can be inserted and removed in the same manner as the stereo pair slide holder. It also would be possible to provide masks in the stereo viewers or in the projection devices directly adjacent the location where the stereo pairs are positioned. The masks may be arranged fixedly or exchangeably.

Figure 11B:
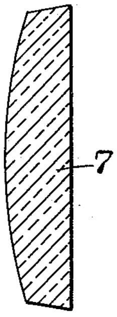
Figure 11A:
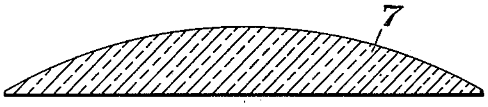

As shown in FIGURES 11, 11*a* and 11*b* the lens 7 is provided with straight parallel edges connected at the ends by curved edges of equal circular shape. Thus, the lens 7 is elongated in plan view.

FIGURE 11 shows the lens required for correcting the distorted image as well as a vertical and horizontal section thereof. The thickness of the glass of the lens shown in FIGURE 11 is 6.5 mm., and the length of its focal point is 50 mm. Its refraction index *n* is 1.5.

What I claim is:

1. In a viewer for a stereoscopic picture pair produced by a single lens system photographic camera provided with a stereo attachment, an opaque casing, a pair of ocular lenses mounted in said casing, mount means in said casing for holding the stereo pair in the path of light rays, pairs of mirrors in said casing adapted to reflect an image of one picture of said picture pair through each of said ocular lenses, rectifying means in said casing to substantially correct the distortions in said picture pair caused by said stereo attachment in the taking of the picture pair, and mask means provided with a double trapezoidal opening and mounted in said casing adjacent said picture pair and between the stereo pair and said pairs of mirrors.

2. In a projector for projecting a stereoscopic picture pair produced by a single lens system photographic camera provided with a stereo attachment, an opaque casing, a source of light in said casing, mount means in said casing for holding said picture pair in the path of light rays from said source of light, a pair of projection lenses mounted in said casing, reflecting means in said casing for reflecting the projected image of one of the pictures of said picture pair through each of said projection lenses, rectifying means in said casing for substantially correcting the distortions in said picture pair caused by said stereo attachment in the taking of the picture pair, and mask means provided with a double trapezoidal opening interposed between said reflecting means and said stereo pair in the casing to provide clear and definite boundary portions of the stereo pair for correction by said rectifying means.

3. In a viewer for a stereoscopic picture pair produced by a single lens system photographic camera provided with a stereo attachment, an opaque casing, a pair of ocular lenses mounted in said casing, mount means in said casing for holding the stereo pair in the path of light rays, pairs of mirrors in said casing adapted to reflect an image of one picture of said picture pair through each of said ocular lenses, rectifying means in said casing to substantially correct the distortions in said picture pair caused by said stereo attachment in the taking of the picture pair, and mask means provided with a double trapezoidal opening and mounted in said casing adjacent said picture pair.

References Cited in the file of this patent

UNITED STATES PATENTS

| | | |
|---|---|---|
| 40,798 | Wheeler et al. | Dec. 1, 1863 |
| 1,074,284 | Neuhaus | Sept. 30, 1913 |
| 2,282,151 | Austin | May 5, 1942 |
| 2,301,274 | Greiser | Nov. 10, 1942 |
| 2,690,022 | Sacre | Sept. 28, 1954 |
| 2,883,907 | Silent | Apr. 28, 1959 |

FOREIGN PATENTS

| | | |
|---|---|---|
| 708,644 | Great Britain | May 5, 1954 |
| 660,600 | Germany | May 30, 1938 |
| 917,818 | Germany | Sept. 13, 1954 |
| 602,384 | France | Dec. 23, 1925 |
| 874,682 | France | May 18, 1942 |
| 1,025,026 | France | Jan. 21, 1953 |

OTHER REFERENCES

PSA Journal, article by Robertson, "Lesser-Known Methods for Single Lens Stereoscopy," vol. 21, No. 3, March 1955, pages 42 and 43 cited.